United States Patent
Kim

(10) Patent No.: US 8,178,245 B2
(45) Date of Patent: May 15, 2012

(54) ELECTRODE ASSEMBLY HAVING POROUS SEPARATOR THAT CONTAINS AN ANTACID AND SECONDARY BATTERY HAVING THE SAME

(75) Inventor: Jin-Hee Kim, Suwon-Si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 436 days.

(21) Appl. No.: 12/426,846

(22) Filed: Apr. 20, 2009

(65) Prior Publication Data

US 2009/0269664 A1  Oct. 29, 2009

(30) Foreign Application Priority Data

Apr. 24, 2008  (KR) ................ 10-2008-0038219

(51) Int. Cl.
*H01M 2/16* (2006.01)
(52) U.S. Cl. ........................ 429/248; 429/252
(58) Field of Classification Search ........... 429/247–254
See application file for complete search history.

(56) References Cited

U.S. PATENT DOCUMENTS

| | | | | |
|---|---|---|---|---|
| 5,298,348 | A * | 3/1994 | Kung | 429/101 |
| 2003/0228520 | A1 | 12/2003 | Kaun | |
| 2006/0209493 | A1* | 9/2006 | Fujino et al. | 361/306.3 |
| 2008/0070107 | A1* | 3/2008 | Kasamatsu et al. | 429/144 |

FOREIGN PATENT DOCUMENTS

| | | |
|---|---|---|
| JP | 10-163075 | 6/1998 |
| JP | 2005-235508 | 9/2005 |
| KR | 1020070012057 | 1/2007 |
| KR | 1020070067703 A | 6/2007 |
| KR | 100749626 B1 | 8/2007 |

OTHER PUBLICATIONS

KIPO machine translation of KR 10-07496262.*
Office Action dated Nov. 30, 2009 for corresponding Korean Application No. 10-2008-0038219.
Notice of Allowance issued May 24, 2010 for corresponding KR 10-2008-0038219.

* cited by examiner

*Primary Examiner* — Barbara Gilliam
*Assistant Examiner* — Maria J Laios
(74) *Attorney, Agent, or Firm* — Knobbe, Martens, Olson & Bear, LLP

(57) ABSTRACT

An electrode assembly and a secondary battery having the same are provided. The electrode assembly includes a positive electrode including a positive electrode active material layer, a negative electrode including a negative electrode active material layer, and a porous layer for separating the positive and negative electrodes from each other that is formed of a combination of a ceramic material having a particle size of about 50 to 300 nm (particle size distribution value: D50) and a binder. Moreover, the porous layer contains an antacid. The secondary battery having the electrode assembly has satisfactory lifespan and overcharge characteristics.

11 Claims, 1 Drawing Sheet

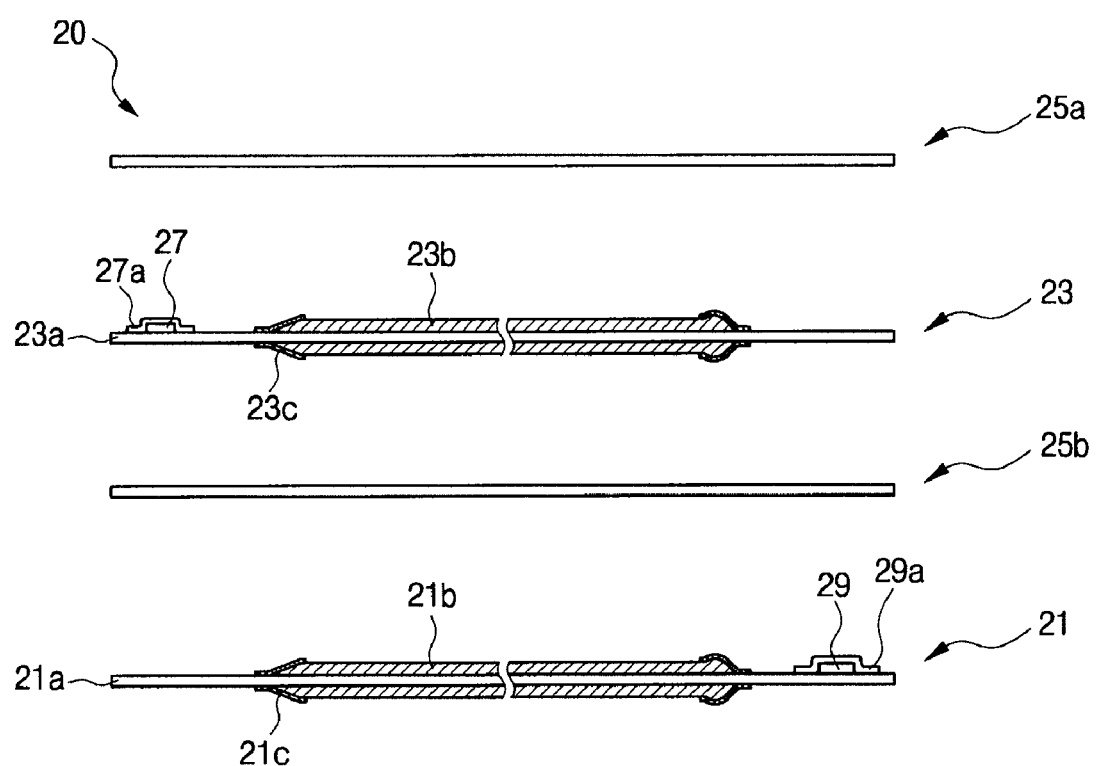

ELECTRODE ASSEMBLY HAVING POROUS SEPARATOR THAT CONTAINS AN ANTACID AND SECONDARY BATTERY HAVING THE SAME

CROSS-REFERENCE TO RELATED APPLICATION

This application claims the benefit of Korean Patent Application No. 2008-38219, filed Apr. 24, 2008, the disclosure of which is hereby incorporated herein by reference in its entirety.

BACKGROUND OF THE INVENTION

1. Field of the Invention

The present invention relates to an electrode assembly and a secondary battery having the same, and more particularly, to a secondary battery that inhibits corrosion and has sufficient lifespan and overcharge characteristics.

2. Description of the Related Art

In recent years, the rapid development of small and lightweight portable electronic devices has generated an increasing need for high-capacity, small-sized batteries. In particular, lithium ion secondary batteries can provide an operating voltage of at least about 3.6 V, which is about 3 times higher than nickel-cadmium batteries or nickel-hydrogen batteries widely used in portable electronic devices, and they have a higher energy density per unit weight than nickel-cadmium batteries or nickel-hydrogen batteries. For these reasons, research into lithium ion secondary batteries has rapidly progressed.

In a lithium ion secondary battery, electrical energy is generated due to oxidation and reduction reactions, which occur when lithium ions are intercalated/deintercalated at positive and negative electrodes. Fabrication of the lithium ion secondary battery involves forming positive and negative electrodes out of materials capable of reversibly intercalating/deintercalating lithium ions and filling an organic electrolyte or polymer electrolyte between the positive and negative electrodes.

The lithium ion secondary battery includes an electrode assembly in which a negative electrode plate and a positive electrode plate with a separator interposed therebetween are wound in the form of a jelly-roll, a can for containing the electrode assembly and an electrolyte, and a cap assembly mounted on the can.

Conventionally, a single or multiple polyolefin micro-porous polymer layer formed of at least one of polypropylene (PP) and polyethylene (PE) was used as the separator. However, since the polyolefin micro-porous polymer layer serving as the separator has a sheet or film shape, when heat is generated due to internal shorting or overcharge, pores may be clogged and the film-type separator may shrink.

Accordingly, when the film-type separator shrinks due to heat generated in the lithium ion secondary battery, portions of the positive and negative electrodes, which are not separated by the shrunk separator, are brought into contact with each other, thereby causing ignition, bursting, or explosion.

In order to make up for these weak points in the film-type separator, a considerable amount of research has focused on forming a ceramic separator using a porous layer formed of a combination of a binder and a ceramic material, such as silica ($SiO_2$), alumina ($Al_2O_3$), zirconium oxide ($ZrO_2$), or titanium oxide ($TiO_2$).

In this case, the ceramic separator may make up for the fusion and shrinkage of a film-type polyolefin separator at a high temperature of about 120° C. or higher. As a result, there is a growing tendency to use both a conventional film-type separator and a ceramic separator.

However, when both the film-type separator and the ceramic separator are used, an additional material is required, thereby increasing fabrication costs. In addition, it is necessary to consider compatibility between the film-type separator and the ceramic separator as an additional quality control item in the fabrication process. Furthermore, a lithium ion secondary battery must be designed in consideration of the designs of the respective separators and a correlation between the film-type separator and the ceramic separator. As a result, material, design, and fabrication costs are increased.

Therefore, various methods for replacing the film-type separator by only a ceramic separator have been developed and proposed in order to overcome the thermal vulnerability of a conventional film-type separator. In this case, however, a ceramic layer needs to be made denser so that internal short-circuiting may be prevented using only a ceramic separator. Accordingly, the ceramic layer must be formed of ceramic powder with a small particle size.

However, when ceramic power with a small particle size is used, the ceramic layer becomes apt to absorb moisture from the atmosphere.

Also, when the ceramic powder is too dense, it hinders smooth movement of lithium ions, which may shorten the lifespan of the lithium ion secondary battery. As a result, the pursuit of a high degree of safety has required the sacrifice of reliability.

Therefore, in order to replace a conventional film-type separator by a ceramic separator, it is necessary to optimally design a lithium ion secondary battery so as to ensure its safety without diminishing its reliability.

SUMMARY OF THE INVENTION

An aspect of the present invention provides a secondary battery that has satisfactory lifespan and overcharge characteristics.

According to an aspect of the present invention, an electrode assembly includes: a positive electrode including a positive electrode active material layer; a negative electrode including a negative electrode active material layer; and a porous layer for separating the positive and negative electrodes from each other that is formed of a combination of a ceramic material having a particle size of about 50 to 300 nm (particle size distribution value: D50) and a binder. Moreover, the porous layer contains an antacid.

According to another aspect of the present invention, a secondary battery includes: an electrode assembly including a positive electrode including a positive electrode active material layer; a negative electrode including a negative electrode active material layer; a porous layer for separating the positive and negative electrodes from each other that is formed of a combination of a ceramic material having a particle size of about 50 to 300 nm (particle size distribution value: D50) and a binder; and an electrolyte. Moreover, the porous layer contains an antacid.

The antacid may include at least one selected from the group consisting of magnesium oxide (MgO), magnesium hydroxide ($Mg(OH)_2$), and magnesium silicate ($MgSiO_3$).

The ceramic material may include at least one selected from the group consisting of silica ($SiO_2$), alumina ($Al_2O_3$), zirconium oxide ($ZrO_2$), and titanium oxide ($TiO_2$).

The porous layer may contain 1 to 10 parts by weight antacid based on 100 parts by weight ceramic material.

Additional aspects and/or advantages of the invention will be set forth in part in the description which follows and in part will be obvious from the description or may be learned by practice of the invention.

BRIEF DESCRIPTION OF THE DRAWINGS

FIG. 1 is a cross-sectional view of the electrode assembly according to an exemplary example of the present invention.

DETAILED DESCRIPTION OF THE INVENTION

The present invention will now be described in detail with reference to exemplary embodiments thereof.

An electrode assembly having a separator and a secondary battery including the electrode assembly according to exemplary embodiments of the present invention will now be described.

Referring to FIG. 1, the electrode assembly 20 includes a first electrode 21 (hereinafter, a positive electrode), a second electrode 23 (hereinafter, a negative electrode) and separators 25a and 25b.

The separators 25a and 25b according to the present invention includes a porous layer formed of a combination of a ceramic material and a binder. The ceramic material and the binder are mixed with a solvent to form a paste, and a porous layer is formed using the paste on at least one of a positive electrode and a negative electrode.

The porous layer may function as a conventional film-type separator formed of polyethylene (PE) or polypropylene (PP).

The ceramic material may include at least one selected from the group consisting of silica ($SiO_2$), alumina ($Al_2O_3$), zirconium oxide ($ZrO_2$), and titanium oxide ($TiO_2$). Alternatively, the ceramic material may include one selected from the group consisting of insulating nitride, hydroxide, a ketone of each of zirconium, aluminum, silicon, and titanium, and a mixture thereof. The insulating nitride is mentioned because a conductive nitride, such as titanium nitride (TiN), is not appropriate for the ceramic material according to the present invention.

The ceramic material may have a particle size of about 50 to 300 nm (particle size distribution value: D50). In at least one implementation, 50% of the peak valve of particle size falls within the range of 50 to 300 nm.

The particle size distribution value D50 corresponds to half of a peak value in a cumulative distribution curve obtained using a particle size analyzer, which is well known to one of ordinary skill in the art and thus will not be described in detail here.

When the ceramic material has a particle size of less than 50 nm (particle size distribution value: D50), the ceramic material has an excessively high moisture content so that the HF content in an electrolyte may increase sharply. As a result, the lifespan of the ceramic material may be reduced and bursting may occur due to generation of gas during overcharge, thereby degrading overcharge characteristics.

When the ceramic material has a particle size of more than 300 nm, the ceramic material has an unreliable insulation characteristic and may be vulnerable to internal shorting, thereby degrading overcharge characteristics.

Also, the porous layer formed of a combination of the ceramic material and the binder may contain an antacid.

The antacid may function to remove or reduce a strong acid, such as HF, which is generated in the secondary battery.

The antacid may include magnesium oxide (MgO), magnesium hydroxide ($Mg(OH)_2$), or magnesium silicate ($MgSiO_3$).

When the ceramic material has fine particles, the specific surface area of the ceramic material increases so that the ceramic material may be more apt to adsorb moisture from the atmosphere. And when the secondary battery contains ceramic particles with a high moisture content, the ceramic particles may react with lithium salts, such as $LiPF_6$ and $LiBF_4$, which are contained in the electrolyte, thus generating a strong acid such as HF and $O_2$ gas. As a result, HF may corrode metals that form a collector made of aluminum or copper foil and an inner wall of a battery can, thereby deteriorating battery performance. In addition, $O_2$ gas may cause the secondary battery to burst or explode.

However, when the ceramic material contains an antacid, the antacid reacts with the strong acid. For example, when the antacid is magnesium oxide (MgO), MgO reacts with HF, thus generating $MgF_2$ and $H_2O$ ($2HF+MgO \rightarrow MgF_2+H_2O$). In this case, $H_2O$ becomes water of crystallization of $MgF_2$. In other words, $H_2O$ is absorbed in $MgF_2$ so that a thin hydrated $MgF_2$ layer is adsorbed on a portion of the surface of the ceramic particle. As a result, the antacid may inhibit corrosion of metals due to HF, thereby preventing degradation of battery performance. In addition, the antacid may inhibit generation of $O_2$ gas, thereby preventing bursting or explosion of the secondary battery due to the $O_2$ gas.

Furthermore, due to the reaction of the antacid (e.g., MgO) with the strong acid, a portion of the porous layer, which corresponds to the antacid, may turn into a pore. Therefore, the porous layer, which is formed of a ceramic material with a fine particle size, has an insulation characteristic and functions as a porous separator, thereby facilitating movement of lithium ions.

In this case, the antacid may have a size of about 10 nm or more (particle size distribution value: D50) to obtain good mixing dispersibility. Also, the size of the antacid may be less than the particle size of the ceramic material so that the pores may be formed to a size advantageous for battery performance.

Also, the porous layer may contain 1 to 10 parts by weight antacid based on 100 parts by weight ceramic material.

When the porous layer contains less than 1 part by weight antacid, an antacid effect and a pore generation effect are reduced, and the ceramic layer is so dense that lithium ions cannot smoothly move at a low temperature, thereby degrading lifespan. When the porous layer contains more than 10 parts by weight antacid, the porous layer becomes so porous due to the antacid that its insulation characteristics become unreliable, thereby lowering overcharge characteristics.

The binder may include a synthetic rubber latex binder or an acrylic rubber binder with a crosslinking structure.

The synthetic rubber latex binder may include at least one polymer latex selected from the group consisting of styrene butadiene rubber (SBR) latex, nitrile butadiene rubber (NBR) latex, methyl methacrylate butadiene rubber latex, chloroprene rubber latex, carboxylated styrene-butadiene rubber latex, and modified polyorganosiloxane-based polymer latex. The polymer latex may include an aqueous dispersant. 0.1 to 20 parts by weight polymer latex solid may be contained based on 100 parts by weight electrode active material. When less than 0.1 parts by weight polymer latex solid is used, adhesion of the porous layer to the collector may be unreliable. When more than 20 parts by weight polymer latex solid is used, the polymer latex may adversely affect battery characteristics.

Also, the acrylic rubber binder having a crosslinking structure may be obtained by a crosslinking reaction of a polymer or co-polymer of an acrylic main monomer with a crosslinking co-monomer. When only the polymer or co-polymer of the acrylic main monomer is used, a coupling structure may be weak and easily cut. However, when the polymer or co-polymer of the acrylic main monomer combines with the crosslinking co-monomer due to the cross-linking reaction, a tighter net structure can be formed. As cross-linking degree increases, it becomes more difficult to swell a polymer having a net structure in a solvent. The acrylic rubber binder having the cross-linking structure may have a 3-dimensional cross-linking structure having 2 to 10 cross-linking points, and more specifically, 4 to 5 cross-linking points, based on 10000 molecular weight units of a main chain molecule. Thus, the acrylic rubber binder having the cross-linking structure according to the present invention may have good resistance to swelling in the electrolyte.

The ceramic material may decompose at a temperature of about 1000° C. or higher, and the acrylic rubber binder having the cross-linking structure may decompose at a temperature of about 250° C. or higher, so that the heat resistance of a secondary battery can be increased to improve battery safety with regard to internal short-circuiting.

The acrylic main monomer may include at least one selected from the group consisting of: one alkoxyalkyl acrylate selected from the group consisting of methoxymethyl acrylate, methoxyethyl acrylate, ethoxyethyl acrylate, buthoxyethylacrylate, methoxyethoxyethyl acrylate, and dicyclopentenyloxyethyl acrylate; one alkenyl acrylate or alkenyl methacrylate selected from the group consisting of vinyl methacrylate, vinyl acrylate, allyl methacrylate, 1,1-dimethylpropenyl methacrylate, 1,1-dimethylpropenyl acrylate, 3,3-dimethylbutenyl methacrylate, and 3,3-dimethylbutenyl acrylate; one unsaturated dicarboxylic acid ester selected out of divinyl itaconate and divinyl maleate; one vinyl ether selected out of vinyl 1,1-dimethylpropenyl ether and vinyl 3,3-dimethylbutenyl ether; 1-acryloyloxy-1-phenylethene; and methyl methacrylate.

The cross-linking co-monomer may include at least one selected from the group consisting of: one alkyl acrylate selected from the group consisting of 2-ethylhexyl acrylate, methyl acrylate, ethyl acrylate, propyl acrylate, buthyl acrylate, octyl acrylate, and iso-octyl acrylate; one alkenyl chloroacetate selected out of vinyl chloroacetate and acryl chloroacetate; one glycidyl ester or ether selected from the group consisting of glycidyl acrylate, vinylglycidyl ether, and acryl glycidyl ether; one unsaturated carboxylic acid selected from the group consisting of acrylic acid, methacrylic acid, and maleic acid; 2-chloroehtyl vinyl ether; chloromethyl styrene; and acrylonitrile.

Subsequently, the electrode assembly with the separator and the secondary battery having the electrode assembly include positive and negative electrodes.

The positive electrode 21 may include a positive electrode active material 21b capable of reversibly intercalating and deintercalating lithium ions. Typical examples of the positive electrode active material may include lithium-transitional metal oxides, such as $LiCoO_2$, $LiNiO_2$, $LiMnO_2$, $LiMn_2O_4$, and $LiNi_{1-x-y}CO_xM_yO_2$ ($0 \leq x \leq 1$, $0 \leq y \leq 1$, $0 \leq x+y \leq 1$, M is a metal, such as Al, Sr, Mg, or La). However, the present invention is not limited to the above-described kinds of positive electrode active materials.

The positive electrode 21 may include an insulating member 21c formed to cover at least one of both ends of the positive electrode active material layer 21b.

The insulating member 21c may be an insulating tape which is composed of an adhesive layer and an insulating film attached to one side of the adhesive layer. Thus, the shape and material of the insulating member 21c are not limited in the present invention.

For example, the adhesive layer may be formed of an ethylene-acrylic ester copolymer, a rubber-based adhesive or an ethylene acetic acid vinyl copolymer, and the insulating film may be formed of polypropylene, polyethylene terephthalate or polyethylene naphthalate.

The negative electrode 23 may include a negative electrode active material 23b capable of reversibly intercalating and deintercalating lithium ions. The negative electrode active material may include a carbon-based negative electrode active material, such as crystalline or amorphous carbon or a carbon composite. However, the present invention is not limited to the above-described kinds of negative electrode active materials.

The negative electrode 23 may also include an insulating member 23c formed to cover at least one of the both ends of the negative electrode active material layer 23b.

The insulating member 23c may be an insulating tape composed of an adhesive layer and an insulating film attached to the one side of the adhesive layer. However, the shape and material of the insulating member 23c are not limited in the present invention.

For example, the insulating layer may be formed of an ethylene-acrylic ester copolymer, a rubber-based adhesive or an ethylene acetic acid vinyl copolymer. The insulating film may be formed of polypropylene, polyethylene terephthalate or polyethylene naphthalate.

Also, the positive electrode may include a positive electrode collector 21a, which may be formed of aluminum (Al) or an Al alloy. The negative electrode may include a negative electrode collector 23a, which may be formed of copper (Cu) or a Cu alloy. Each of the positive and negative electrode collectors may be provided in the form of a foil, a film, a sheet, a punched structure, a porous structure, or a foam structure.

In addition, the positive electrode slurry including the positive electrode active material is not applied to one or both ends of the positive electrode collector 21a, thereby forming the positive electrode non-coating portion exposing the positive electrode collector 21a, and the positive electrode tab 29 delivering electrons collected in the positive electrode collector 21a to an external circuit and formed in a thin film type of nickel or aluminum is joined to the positive electrode non-coating portion.

A protection member 29a may be formed over a portion to which the positive electrode tab 29 is joined.

Also, the negative electrode slurry including the negative electrode active material is not applied to one or both ends of the negative electrode collector 23a, thereby forming the negative electrode non-coating portion exposing the negative electrode collector 23a, and the negative electrode tab 27 which delivers the electrons collected in the negative electrode collector 23a to an external circuit and is formed of a nickel thin film is joined to the negative electrode non-coating portion.

A protection member 27a may cover the negative electrode tab 27 to be joined.

In the present invention, while the porous layer is formed on at least one of the positive and negative electrodes, the positive and negative electrodes are stacked, or both stacked and wound, to form an electrode group. As described above, since the porous layer may function as a separator, forming an additional separator between the positive and negative electrodes may be omitted.

A conventional film-type separator shrinks at a high temperature, while the porous layer according to the present invention neither shrinks nor melts at a high temperature. In the case of a conventional polyolefin film-type separator, when an internal short occurs, portions adjacent to a damaged portion caused by initial generation of heat keep shrinking or melting so that a burnt portion of the film-type separator expands, thus resulting in a more severe short. In contrast, the positive and/or negative electrodes on which the porous layer is formed are only slightly damaged by an internal short, and the damaged portion does not expand. During overcharge, only a mild short occurs at the positive and/or negative electrodes on which the porous layer is formed. As a result, an overcharge current is continuously consumed so that the secondary battery may be maintained at a constant voltage of about 5 to 6V and a temperature of about 100° C. or lower, thereby improving battery safety in overcharge.

In particular, according to the present invention, since a dense ceramic layer may be formed using ceramic particles with a certain size, an internal short can be effectively prevented, thereby enhancing overcharge characteristics. In addition, the porous layer contains not only the ceramic material but also the antacid, thereby improving lifespan.

Next, the secondary battery including the electrode assembly having the separator according to the present invention includes an electrolyte.

According to the present invention, the electrolyte may contain a nonaqueous organic solvent. The nonaqueous organic solvent may include carbonate, ester, ether, or ketone. The carbonate may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), or butylene carbonate (BC). The ester may include butyrolactone (BL), decanolide, valerolactone, mevalonolactone, caprolactone, n-methyl acetate, n-ethyl acetate, or n-propyl acetate. The ether may include dibutyl ether, and the ketone may include polymethylvinyl ketone. However, the present invention is not limited to the above-described kinds of nonaqueous organic solvents.

When the nonaqueous organic solvent is a carbonate organic solvent, a mixture of a cyclic carbonate and a chain carbonate may be used as the nonaqueous organic solvent. In this case, the cyclic carbonate may be mixed with the chain carbonate in a volume ratio of 1:1 to 1:9, more specifically, a volume ratio of 1:1.5 to 1:4, in order to obtain good electrolyte performance.

The electrolyte according to the present invention may be obtained by adding an aromatic hydrocarbon organic solvent to the carbonate solvent. The aromatic hydrocarbon organic solvent may include an aromatic hydrocarbon compound.

For example, the aromatic hydrocarbon organic solvent may include benzene, fluorobenzene, toluene, fluorotoluene, trifluorotoluene, or xylene. When the electrolyte further contains the aromatic hydrocarbon organic solvent, the carbonate organic solvent may be mixed with the aromatic hydrocarbon organic solvent in a volume ratio of 1:1 to 30:1 in order to obtain good electrolyte performance.

Furthermore, the electrolyte according to the present invention may contain lithium salts, which function as a source of lithium ions to enable basic operation of the lithium ion secondary battery. For example, the lithium salts may include one selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(CyF_{2y+1}SO_2)$ (here, x and y are natural numbers), $LiSO_3CF_3$, and a mixture thereof.

The lithium salts may be used in a concentration of about 0.6 to 2.0M, more specifically, 0.7 to 1.6M. When the concentration of the lithium salts is less than 0.6M, the electrolyte has low conductivity and does not exhibit good performance. When the concentration of the lithium salts is more than 2.0M, the electrolyte has high viscosity and reduces the mobility of lithium ions.

The separator according to the present invention is interposed between the positive and negative electrodes, and the positive and negative electrodes are stacked, or both stacked and wound, to form an electrode group. Thereafter, the electrode group is injected into and contained in a can or similar case, thereby completing fabrication of the lithium ion secondary battery.

Hereinafter, exemplary embodiments according to the present invention and comparative examples will be described. This invention may, however, be embodied in different forms and should not be construed as limited to the exemplary embodiments set forth herein.

Embodiment 1

$LiCoO_2$ as a positive electrode active material, polyvinylidene fluoride (PVDF) as a binder, and carbon as a conductive agent were mixed in a weight ratio of 92:4:4 and dispersed in N-methyl-2-pyrrolidone, thereby producing positive electrode slurry. The positive electrode slurry was coated on a 20 μm-thick aluminum foil, dried, and rolled to form a positive electrode. Artificial graphite as a negative electrode active material, styrene-butadiene rubber as a binder, and carboxymethylcellulose (CMC) as a viscosity agent were mixed in a weight ratio of 96:2:2 and dispersed in water, thereby producing negative electrode slurry. The negative electrode slurry was coated on a 15 μm-thick copper foil, dried, and rolled to form a negative electrode.

A porous layer formed of a combination of a ceramic material and a binder was interposed between the positive and negative electrodes. The positive and negative electrodes with the porous layer interposed therebetween were wound, compressed, and inserted into a cylindrical can.

Alumina ($Al_2O_3$) was used as the ceramic material, and acrylic rubber was used as the binder. A mixture of $Al_2O_3$ and acrylic rubber was diluted with an N-methyl-2-pyrrolidone/cyclohexanone mixture solvent to form a porous paste. And, the porous layer was formed to a thickness of about 25 μm between the positive and negative electrodes using the porous paste.

Also, the ceramic material had a particle size of about 300 nm (particle size distribution value: D50), and 1 part by weight MgO as an antacid was further contained based on 100 parts by weight ceramic material.

Thereafter, an electrolyte was injected into the cylindrical can to complete fabrication of a lithium ion secondary battery.

Embodiment 2

The same process as in Embodiment 1 was performed, except that 10 parts by weight MgO as an antacid was further contained based on 100 parts by weight ceramic material.

Embodiment 3

The same process as in Embodiment 1 was performed except that 2 parts by weight magnesium hydroxide ($Mg(OH)_2$) as an antacid was further contained based on 100 parts by weight ceramic material.

Embodiment 4

The same process as in Embodiment 1 was performed except that 9 parts by weight Mg(OH)$_2$ as an antacid was further contained based on 100 parts by weight ceramic material.

Embodiment 5

The same process as in Embodiment 1 was performed except that 3 parts by weight magnesium silicate (MgSiO$_3$) as an antacid was further contained based on 100 parts by weight ceramic material.

Embodiment 6

The same process as in Embodiment 1 was performed except that 8 parts by weight MgSiO$_3$ as an antacid was further contained based on 100 parts by weight ceramic material.

Embodiment 7

The same process as in Embodiment 1 was performed except that a ceramic material having a particle size of about 150 nm (particle size distribution value: D50) was used, and 5 parts by weight MgO as an antacid was further contained based on 100 parts by weight ceramic material.

Embodiment 8

The same process as in Embodiment 1 was performed except that a ceramic material having a particle size of about 150 nm (particle size distribution value: D50) was used, and 10 parts by weight MgO as an antacid was further contained based on 100 parts by weight ceramic material.

Embodiment 9

The same process as in Embodiment 1 was performed except that a ceramic material having a particle size of about 100 nm (particle size distribution value: D50) was used, and 7 parts by weight Mg(OH)$_2$ as an antacid was further contained based on 100 parts by weight ceramic material.

Embodiment 10

The same process as in Embodiment 1 was performed except that a ceramic material having a particle size of about 100 nm (particle size distribution value: D50) was used, and 9 parts by weight Mg(OH)$_2$ as an antacid was further contained based on 100 parts by weight ceramic material.

Embodiment 11

The same process as in Embodiment 1 was performed except that a ceramic material having a particle size of about 50 nm (particle size distribution value: D50) was used, and 4 parts by weight MgSiO$_3$ as an antacid was further contained based on 100 parts by weight ceramic material.

Embodiment 12

The same process as in Embodiment 1 was performed except that a ceramic material having a particle size of about 50 nm (particle size distribution value: D50) was used, and 8 parts by weight MgSiO$_3$ as an antacid was further contained based on 100 parts by weight ceramic material.

Comparative Example 1

The same process as in Embodiment 1 was performed except that a ceramic material having a particle size of about 500 nm (particle size distribution value: D50) was used and no antacid was added.

Comparative Example 2

The same process as in Embodiment 1 was performed except that a ceramic material having a particle size of about 500 nm (particle size distribution value: D50) was used, and 5 parts by weight MgO as an antacid was further contained based on 100 parts by weight ceramic material.

Comparative Example 3

The same process as in Embodiment 1 was performed except that a ceramic material having a particle size of about 500 nm (particle size distribution value: D50) was used, and 5 parts by weight Mg(OH)$_2$ as an antacid was further contained based on 100 parts by weight ceramic material.

Comparative Example 4

The same process as in Embodiment 1 was performed except that a ceramic material having a particle size of about 500 nm (particle size distribution value: D50) was used, and 5 parts by weight MgSiO$_3$ as an antacid was further contained based on 100 parts by weight ceramic material.

Comparative Example 5

The same process as in Embodiment 1 was performed except that a ceramic material having a particle size of about 400 nm (particle size distribution value: D50) was used and no antacid was added.

Comparative Example 6

The same process as in Embodiment 1 was performed except that a ceramic material having a particle size of about 400 nm (particle size distribution value: D50) was used, and 5 parts by weight MgO as an antacid was further contained based on 100 parts by weight ceramic material.

Comparative Example 7

The same process as in Embodiment 1 was performed except that a ceramic material having a particle size of about 350 nm (particle size distribution value: D50) was used and no antacid was added.

Comparative Example 8

The same process as in Embodiment 1 was performed except that a ceramic material having a particle size of about 350 nm (particle size distribution value: D50) was used, and 5 parts by weight MgO as an antacid was further contained based on 100 parts by weight ceramic material.

Comparative Example 9

The same process as in Embodiment 1 was performed except that no antacid was added.

Comparative Example 10

The same process as in Embodiment 1 was performed except that 0.5 parts by weight MgO as an antacid was further contained based on 100 parts by weight ceramic material.

Comparative Example 11

The same process as in Embodiment 1 was performed except that 15 parts by weight MgO as an antacid was further contained based on 100 parts by weight ceramic material.

Comparative Example 12

The same process as in Embodiment 1 was performed except that 20 parts by weight MgO as an antacid was further contained based on 100 parts by weight ceramic material.

Comparative Example 13

The same process as in Embodiment 1 was performed except that a ceramic material having a particle size of about 30 nm (particle size distribution value: D50) was used and no antacid was added.

Comparative Example 14

The same process as in Embodiment 1 was performed except that a ceramic material having a particle size of about 30 nm (particle size distribution value: D50) was used, and 20 parts by weight MgO as an antacid was further contained based on 100 parts by weight ceramic material.

The HF contents of lithium ion secondary batteries fabricated according to Embodiments 1 through 12 and Comparative examples 1 to 14 were measured. In detail, each of the completely assembled lithium ion secondary batteries was charged and discharged and disassembled in a discharged state, an electrolyte was extracted by centrifugal separation, and the HF content of the electrolyte was measured and then confirmed using an acid-base titration method and a pH meter method. When the HF content of the electrolyte was 500 ppm or less, the result was indicated as "OK", while when the HF content of the electrolyte exceeded 500 ppm, the result was indicated as "NG".

Also, the lithium ion secondary batteries fabricated according to Embodiments 1 through 12 and Comparative examples 1 to 14 were charged to a voltage of 4.2V at a charge/discharge rate of 1 C at a normal temperature and discharged to a voltage of 3V. The charge-discharge cycle was repeated 300 times, and a percentage (%) of a discharge capacity obtained during a first charge-discharge cycle that was obtained during a 300th charge-discharge cycle was calculated. When the discharge capacity obtained during the $300^{th}$ charge-discharge cycle was 80% or higher, the result was indicated as "OK", while when the discharge capacity obtained during the $300^{th}$ charge-discharge cycle was lower than 80%, the result was indicated as "NG".

Furthermore, the lithium ion secondary batteries fabricated according to Embodiments 1 through 12 and Comparative examples 1 to 14 were charged to a voltage of 12V for 3 hours at a charge/discharge rate of 1 C, and overcharge characteristics of the lithium ion secondary batteries were measured. In detail, 10 batteries fabricated under the same process conditions described in each of Embodiments 1 through 12 and Comparative examples 1 to 14 were tested. As a result, when ignition or explosion occurred in at least one of the 10 batteries, the result was indicated as "NG", while when neither ignition nor explosion occurred in the 10 batteries, the result was indicated as "OK".

The measurement results are arranged in Table 1.

| Division | Ceramic particle size (nm) | Kind of antacid | Content of antacid | HF content Content (ppm) | HF content Result | $300^{th}$-cycle discharge capacity Capacity (%) | $300^{th}$-cycle discharge capacity Result | Overcharge characteristic |
|---|---|---|---|---|---|---|---|---|
| Embodiment 1 | 300 | MgO | 1 | 450 | OK | 88 | OK | OK |
| Embodiment 2 | 300 | MgO | 10 | 420 | OK | 89 | OK | OK |
| Embodiment 3 | 300 | Mg(OH)$_2$ | 2 | 420 | OK | 90 | OK | OK |
| Embodiment 4 | 300 | Mg(OH)$_2$ | 9 | 390 | OK | 92 | OK | OK |
| Embodiment 5 | 300 | MgSiO$_3$ | 3 | 410 | OK | 88 | OK | OK |
| Embodiment 6 | 300 | MgSiO$_3$ | 8 | 330 | OK | 89 | OK | OK |
| Embodiment 7 | 150 | MgO | 5 | 380 | OK | 82 | OK | OK |
| Embodiment 8 | 150 | MgO | 10 | 350 | OK | 83 | OK | OK |
| Embodiment 9 | 100 | Mg(OH)$_2$ | 7 | 410 | OK | 85 | OK | OK |
| Embodiment 10 | 100 | Mg(OH)$_2$ | 9 | 390 | OK | 86 | OK | OK |
| Embodiment 11 | 50 | MgSiO$_3$ | 4 | 490 | OK | 83 | OK | OK |
| Embodiment 12 | 50 | MgSiO$_3$ | 8 | 460 | OK | 84 | OK | OK |
| Comparative example 1 | 500 | x | 0 | 470 | OK | 85 | OK | NG |
| Comparative example 2 | 500 | MgO | 5 | 390 | OK | 82 | OK | NG |
| Comparative example 3 | 500 | Mg(OH)$_2$ | 5 | 420 | OK | 83 | OK | NG |
| Comparative example 4 | 500 | MgSiO$_3$ | 5 | 400 | OK | 86 | OK | NG |
| Comparative example 5 | 400 | x | 0 | 490 | OK | 87 | OK | NG |

-continued

| Division | Ceramic particle size (nm) | Kind of antacid | Content of antacid | HF content Content (ppm) | HF content Result | 300$^{th}$-cycle discharge capacity Capacity (%) | 300$^{th}$-cycle discharge capacity Result | Overcharge characteristic |
|---|---|---|---|---|---|---|---|---|
| Comparative example 6 | 400 | MgO | 5 | 450 | OK | 88 | OK | NG |
| Comparative example 7 | 350 | x | 0 | 500 | OK | 82 | OK | NG |
| Comparative example 8 | 350 | MgO | 5 | 450 | OK | 83 | OK | NG |
| Comparative example 9 | 300 | x | 0 | 600 | NG | 75 | NG | OK |
| Comparative example 10 | 300 | MgO | 0.5 | 590 | NG | 77 | NG | OK |
| Comparative example 11 | 300 | MgO | 15 | 300 | OK | 80 | OK | NG |
| Comparative example 12 | 300 | MgO | 20 | 290 | OK | 81 | OK | NG |
| Comparative example 13 | 30 | x | 0 | 1000 | NG | 70 | NG | NG |
| Comparative example 14 | 30 | MgO | 20 | 600 | NG | 72 | NG | NG |

Referring to Table 1, in the case of Embodiments 1 through 6, dense ceramic layers were formed using alumina ($Al_2O_3$) having a particle size of 300 nm, so that the ceramic layer could have good insulation characteristics. Thus, the overcharge characteristics of the secondary battery were "OK". Also, the HF content of the electrolyte, which was increased due to the small ceramic particle size, could be reduced using the antacid, so it can be seen that lifespans reflected by the 300$^{th}$-cycle discharge capacity were also "OK".

When the ceramic materials having smaller particle sizes were used, as in Embodiments 7 through 12, the insulation characteristics of a ceramic layer were improved. However, the atmospheric moisture content of the ceramic materials also increased in proportion to the insulation characteristics, and pores through which lithium ions move were clogged. Therefore, it can be concluded that the antacid content needs to be appropriately controlled in order to reduce the HF content of the electrolyte affected by a rise in the moisture content and optimize a pore state. An appropriate antacid content may be obtained with reference to the following Comparative examples 1 through 14.

In Comparative example 1, no antacid was used, and the ceramic material having a particle size of 500 nm was used. Since the ceramic material having a large particle size was used, a ceramic layer alone used as a separator was able to provide sufficient insulation. Accordingly, the separator was vulnerable to internal short-circuiting, so that the overcharge characteristic of the secondary battery was "NG". However, since the ceramic layer had a low atmospheric moisture content due to the large particle size, only a small amount of HF was produced by reaction of moisture with electrolytic soda, so it can be seen that the lifespan of the secondary battery was "OK".

In Comparative examples 2 through 4, the HF content of the electrolyte was reduced compared to Comparative example 1. However, when only a ceramic layer was used as a separator, the separator still did not have sufficient insulation characteristics. Accordingly, the separator was vulnerable to internal shorting, so that the overcharge characteristics of the secondary battery were "NG". In other words, the ceramic layer became too porous to completely prevent an internal short. And when lithium dendrite was precipitated from a negative electrode during overcharge, a short circuit occurred between the negative electrode and a positive electrode, thereby resulting in ignition or explosion.

In Comparative example 5, the ceramic material having a slightly smaller ceramic particle size than in Comparative example 1 was used. Since the atmospheric moisture content of the ceramic material increased, the HF content of the electrolyte slightly increased. In Comparative example 6, the HF content of the electrolyte was lower than in Comparative example 5. However, in both Comparative examples 5 and 6, dense ceramic layers could not be obtained so that the overcharge characteristics of the secondary battery were "NG".

In Comparative example 7, the ceramic material having a smaller particle size than in Comparative example 5 was used. In this case, since the atmospheric moisture content of the ceramic material increased, the HF content of the electrolyte slightly increased. In Comparative example 8, the HF content of the electrolyte was lower than in Comparative example 7. However, in both Comparative examples 7 and 8, dense ceramic layers could not be obtained so that the overcharge characteristics of the secondary battery were "NG".

In Comparative example 9, the ceramic material having a particle size of 300 nm was used, and no antacid was used. In this case, the ceramic particle size was reduced so that a ceramic layer could have good insulation characteristics. Thus, the overcharge characteristic of the secondary battery was "OK". However, since the HF content of the electrolyte increased, the lifespan of the secondary battery was "NG".

In Comparative example 10, the HF content of the electrolyte was slightly lower than in Comparative example 9, but the lifespan of the secondary battery was still "NG".

In Comparative examples 11 and 12, more than 10 parts by weight antacid was contained based on 100 parts by weight ceramic material. In both cases, the HF content of the electrolyte was further reduced, but the ceramic layer became excessively porous due to the antacid, thereby lowering the insulation characteristic. As a result, it can be seen that the overcharge characteristic of the secondary battery was "NG".

In Comparative example 13, the ceramic material having a particle size of 30 nm was used, and no antacid was used. In this case, since the ceramic particle size was too small, the moisture content of the ceramic layer was too high so that the HF content of the electrolyte sharply increased. As a result, the lifespan was "NG". In addition, bursting occurred due to generation of gas during overcharge, so that an overcharge characteristic was also "NG". When the ceramic particle size was too small, the prevention of internal shorting due to a dense ceramic layer was relatively immaterial, while a sharp rise in the HF content of the electrolyte caused by an increase in the moisture content of the ceramic layer became very problematic. Furthermore, an excessively dense separator with nearly clogged pores was obtained, thereby lowering reliability.

In Comparative example 14, unlike in Comparative example 13, 20 parts by weight antacid was contained. In this case, the HF content of the electrolyte was slightly lower than in Comparative example 13. However, since a ceramic layer had a very high moisture content, the antacid was not enough to reduce the excessive HF content. Therefore, both the lifespan and overcharge characteristics of the secondary battery were "NG".

In conclusion, according to the present invention, a porous layer functioning as a separator may be formed of a ceramic material having a particle size of about 50 to 300 nm (particle size distribution value: D50) and 1 to 10 parts by weight antacid based on 100 parts by weight ceramic material. As a result, a lithium ion secondary battery with a desired lifespan and overcharge characteristics can be fabricated.

According to the present invention as described above, an electrode assembly and lithium ion secondary battery with a desired lifespan and overcharge characteristics can be provided.

In addition, an electrode assembly and lithium ion secondary battery according to the present invention can inhibit metals forming an inner wall of a battery can from corroding due to strong acid, such as HF, so as not to degrade the performance of the secondary battery.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. An electrode assembly comprising:
   a positive electrode including a positive electrode active material layer;
   a negative electrode including a negative electrode active material layer; and
   a porous layer for separating the positive and negative electrodes from each other that is formed of a combination of a ceramic material having a particle size distribution value of about 50 to 300 nm and a binder,
   wherein the porous layer contains 1 to 10 parts by weight antacid based on 100 parts by weight ceramic material,
   wherein the particle size distribution value means half of a peak value in a cumulative distribution curve obtained using a particle size analyzer.

2. The electrode assembly according to claim 1, wherein the antacid includes at least one selected from the group consisting of magnesium oxide (MgO), magnesium hydroxide ($Mg(OH)_2$), and magnesium silicate ($MgSiO_3$).

3. The electrode assembly according to claim 1, wherein the ceramic material includes at least one selected from the group consisting of silica ($SiO_2$), alumina ($Al_2O_3$), zirconium oxide ($ZrO_2$), and titanium oxide ($TiO_2$).

4. The electrode assembly according to claim 1, wherein the antacid has a size of 10 nm or more, which is less than the particle size of the ceramic material.

5. The electrode assembly according to claim 1, wherein the binder is a synthetic rubber latex binder or an acrylic rubber binder with a crosslinking structure.

6. A secondary battery comprising:
   an electrode assembly comprising a positive electrode including a positive electrode active material layer, a negative electrode including a negative electrode active material layer, and a porous layer for separating the positive and negative electrodes from each other that is formed of a combination of a ceramic material having a particle size distribution value of about 50 to 300 nm and a binder; and
   an electrolyte,
   wherein the porous layer contains 1 to 10 parts by weight antacid based on 100 parts by weight ceramic material,
   wherein the particle size distribution value means half of a peak value in a cumulative distribution curve obtained using a particle size analyzer.

7. The secondary battery according to claim 6, wherein the antacid includes at least one selected from the group consisting of MgO, $Mg(OH)_2$, and $MgSiO_3$.

8. The secondary battery according to claim 6, wherein the ceramic material includes at least one selected from the group consisting of $SiO_2$, $Al_2O_3$, $ZrO_2$, and $TiO_2$.

9. The secondary battery according to claim 6, wherein the antacid has a size of 10 nm or more, which is less than the particle size of the ceramic material.

10. The secondary battery according to claim 6, wherein the binder is a synthetic rubber latex binder or an acrylic rubber binder with a crosslinking structure.

11. The secondary battery according to claim 6, wherein the electrolyte contains a nonaqueous organic solvent and a lithium salt.

* * * * *